Dec. 20, 1966  C. J. AMATO  3,293,448
PULSE-FORMING CIRCUIT
Filed April 17, 1963  3 Sheets-Sheet 1

INVENTOR.
CARMELO J. AMATO
BY Bosworth, Sessions,
Herrshom & Knowles
ATTORNEYS.

Dec. 20, 1966  C. J. AMATO  3,293,448
PULSE-FORMING CIRCUIT
Filed April 17, 1963  3 Sheets-Sheet 2

INVENTOR.
CARMELO J. AMATO
BY Bosworth, Sessions,
Herzstrom & Knowles
ATTORNEYS.

United States Patent Office 3,293,448
Patented Dec. 20, 1966

3,293,448
PULSE-FORMING CIRCUIT
Carmelo J. Amato, Shaker Heights, Ohio, assignor to Lear Siegler, Inc., Los Angeles, Calif., a corporation of Delaware
Filed Apr. 17, 1963, Ser. No. 273,583
12 Claims. (Cl. 307—88.5)

This invention relates to a pulse-forming circuit and particularly to a pulse-forming circuit for producing unidirectional output pulses which appear alternately at two signal outputs in response to an alternating input signal. The invention is particularly useful in conjunction with cycloconverters for aiding in reducing distortion in the output voltage and current envelopes thereof.

The objects of my invention as well as a description of a preferred embodiment of it and an explanation of its especial utility in conjunction with cycloconverters are set forth below, reference being made to the accompanying drawings in which.

Figure 1:
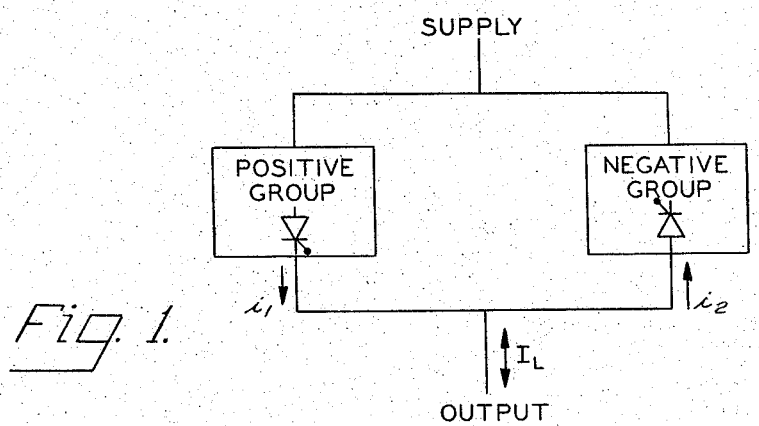
FIGURE 1 is a simplified representation of a basic cycloconverter circuit.

As shown in FIGURE 1, a cycloconverter characteristically comprises two major elements, a positive current group P and a negative current group N, connected in parallel between a polyphase supply and the cycloconverter output which is connected to a load. As is well known, each group P and N may consist of a number of rectifying and switching devices, such as mercury arc rectifiers, silicon controlled rectifiers, or thyratrons, connected in some well-known rectifier configuration. The output current from each group P and N can flow in only one direction. Therefore, in order to supply an alternating output current, the positive and negative groups must be connected back-to-back with respect to the output circuit so that each group may alternately provide a half cycle of each full cycle of output current $I_L$.

Figure 2:
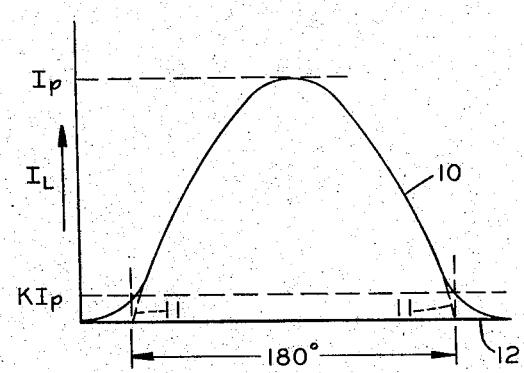
FIGURES 2, 3, 4 and 5 are diagrams illustrating various aspects of the operation of a cycloconverter as well as the usefulness of the circuit embodying my invention in the cycloconverter operation.

FIGURE 2 is a diagram of the half cycle envelope of cycloconverter output current $I_L$ produced by a single current group P, for example, in a cycloconverter having a three-phase supply and a single phase output supplying a resistive load. It will be noted that the half wave current envelope, represented by curve 10, departs from a generally sinusoidal wave form, represented by broken line 11, at its beginning and end and/or at and near the zero current level represented by the straight horizontal line 12. This distortion of the current and voltage wave forms, known as "tailing off," results from the operation of the cycloconverter into loads having a power factor approaching unity. The extent of the tailing off varies as well with the average value and/or the peak value $I_p$ of the half wave envelopes of the output current.

When both current groups P and N are made to conduct alternately, each group, of course, passes only 180° of the distorted envelope shown in FIGURE 2. If, in the operation and control of the cycloconverter, zero output current $I_L$ is selected as the point to switch between the positive and negative groups, the resulting output current wave form is similar to that represented by the solid line curve 14 in FIGURE 3. It will be noted by comparison with a corresponding sinusoidal wave represented by broken line curve 15 that wave form 14 departs substantially from a generally sinusoidal one. The degree of distortion resulting from tailing off when the positive and negative groups of a cycloconverter are switched at zero current can be such as to destroy the usefulness of the cycloconverter output for certain purposes, such as providing constant frequency power in an aircraft electrical system.

Figure 3:
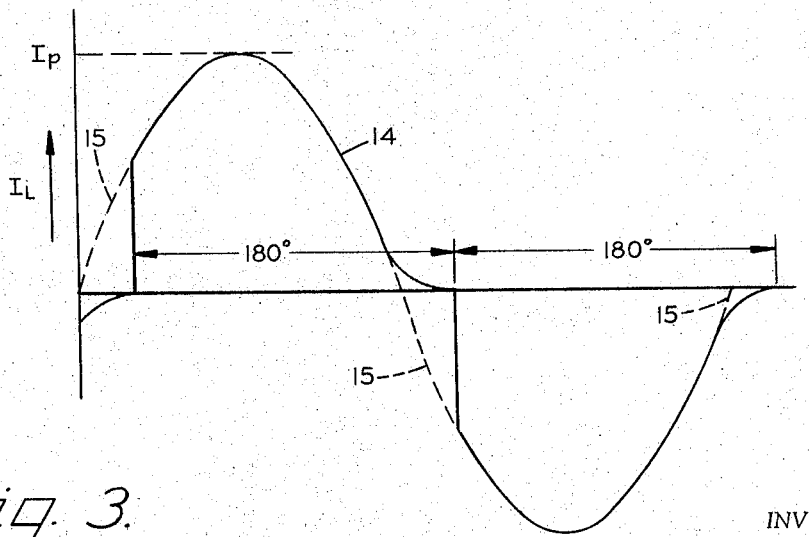
Figure 4:
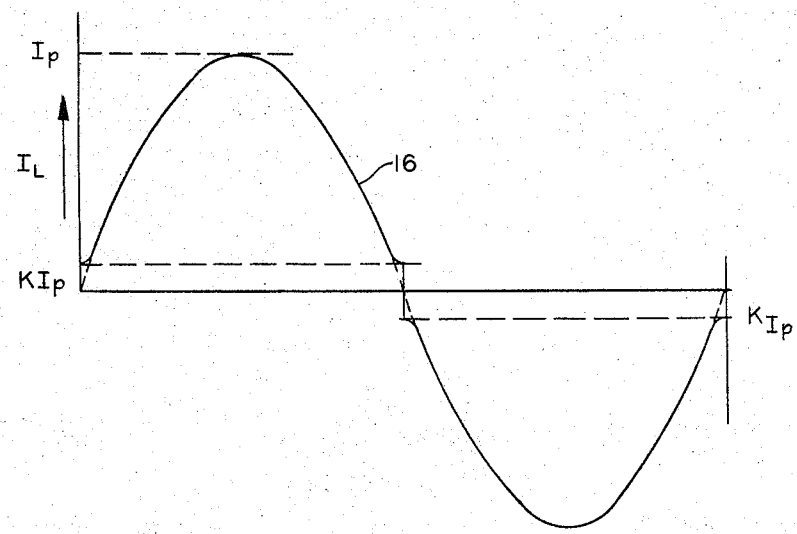

The output current wave form can be substantially improved from that shown in FIGURE 3 if the point of switching between the positive and negative groups is made to occur at approximately the 180° point of an idealized sinusoidal output wave form. It will be noted in FIGURE 2 that the instantaneous level of the current in the actual wave form is not zero at the 180° points in the idealized wave form but rather is some fractional amount of the peak level of the actual half wave, such as current level $KI_p$. Thus, if the current level $KI_p$ is selected to coincide with that current level in the half wave form occurring at the 180° points of the idealized sinusoidal wave form and is employed as the current level for switching between groups P and N, the more nearly sinusoidal wave form represented by curve 16 in FIGURE 4 is produced. Thus, by sensing the load current and adjusting the level of the point of switching between the positive and negative groups so that it is proportional to or a constant fraction of the peak or average half wave value of the load current, it is possible to reduce the effect of tailing off and thereby the distortion otherwise present in the output current and voltage wave forms and to maintain a nearly sinusoidal output at all output load levels.

Switching between positive and negative groups of a cycloconverter can be positively controlled and the point of switching positively selected by controlling the switching pulses supplied to the rectifying and switching devices of the positive and negative groups. Thus, if all of the switching pulses supplied to the rectifying and switching devices of the positive group are blocked, diverted or otherwise suppressed while the switching pulses supplied to the rectifying and switching devices of the negative group are permitted to reach their associated rectifying and switching devices, only the negative group will conduct current to the output and the positive group will conduct no current. The opposite result can be achieved, of course, by suppressing all of the switching pulses supplied to the negative group and not suppressing those intended for the positive group. It will be apparent, therefore, with a blocking or suppressing circuit common to and capable of controlling all the switching pulse supplies of the positive group and another such circuit associated with the negative group, that a set of two signals, one for each group, can control the switching between the positive and negative cycloconverter groups.

It is well known in the cycloconverter art that instantaneous voltage differences exist between the positive and negative groups of switching and rectifying devices. Therefore, the positive control of switching between the positive and negative groups in the manner described above is desirable and advantageous because it prevents the establishment of intergroup paths for currents driven by these instantaneous voltage differences to circulate between the positive and negative groups within the cycloconverter. These intergroup circulating currents have been limited in the past by chokes employed between the groups, but such means do not eliminate them.

The positive selection of the point of switching between the positive and negative groups permits the improvement in output wave form as explained above.

An object of my invention, therefore, is to provide a pulse-forming circuit for producing a unidirectional output signal corresponding to each half wave of an alternating input signal.

Another object is to provide such a pulse-forming circuit used in connection with a cycloconverter having positive and negative groups of switching and rectifying devices for positively switching the conduction of output current between the groups at a selected time with respect to the output wave form.

A further object is to provide such a pulse-forming circuit in which the output signals corresponding to all of the first half waves of alternating input signal appear at a first output terminal and in which all of the output signals corresponding to the second half waves of the input signal appear at a second output terminal.

Another object is to provide such a pulse-forming circuit in which each unidirectional output signal comprises a pulse which begins and ends when the instantaneous value of its corresponding half wave of input signal exceeds or is less than a predetermined fractional amount of its average or peak value while departing from and returning to a zero level, respectively.

A further object is to provide such a pulse-forming circuit employing only static elements including solid state switching and amplifying devices having high reliability and low power requirements.

Figure 5:
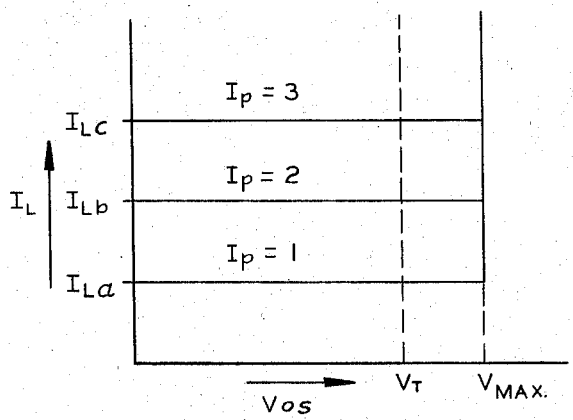

A particular object of my invention is to provide a pulse-forming circuit for providing a unidirectional output signal in response to a half wave of a generally sinusoidal input signal having the relationship to the input signal that is diagrammatically illustrated in FIGURE 5 of the drawings. In FIGURE 5, the voltage $V_{os}$ of the output signal is plotted with respect to the alternating current input for three arbitrarily chosen peak or average values of a half wave of alternating current input. For example, for a given input current having a peak level of $I_p=1$, the output signal voltage $V_{os}$ is zero for all values of input current $I_L$ below a predetermined fraction $I_{La}$ of the input signal current. When the input current $I_L$ reaches the value $I_{La}$, the voltage of the output signal suddenly rises to and beyond a triggering voltage level $V_t$, i.e. a level required to initiate the function assigned the output signal. The rise of output signal voltage $V_{os}$ may be limited at some maximum level $V_{max}$ above the triggering level $V_t$ in order to protect the circuit elements or equipment to which the output voltage signals may be supplied. For higher peak or average values of the current of a half wave of the input signal such as $I_p=2$ and $I_p=3$, the voltage of the output signal $V_{os}$ is held at zero until the current level of a half wave of input signal reaches corresponding factional levels $I_{Lb}$ or $I_{Lc}$ of the peak values.

It will be understood that when the input signal current level $I_L$ falls below the level corresponding to a predetermined fraction of a particular average or peak current value that the output signal voltage $V_{os}$ will suddenly drop from its highest or maximum value $V_{max}$ back to zero and remain there until the current level of the input signal once again exceeds the predetermined fraction of the average or peak value of the input signal.

Figure 6:
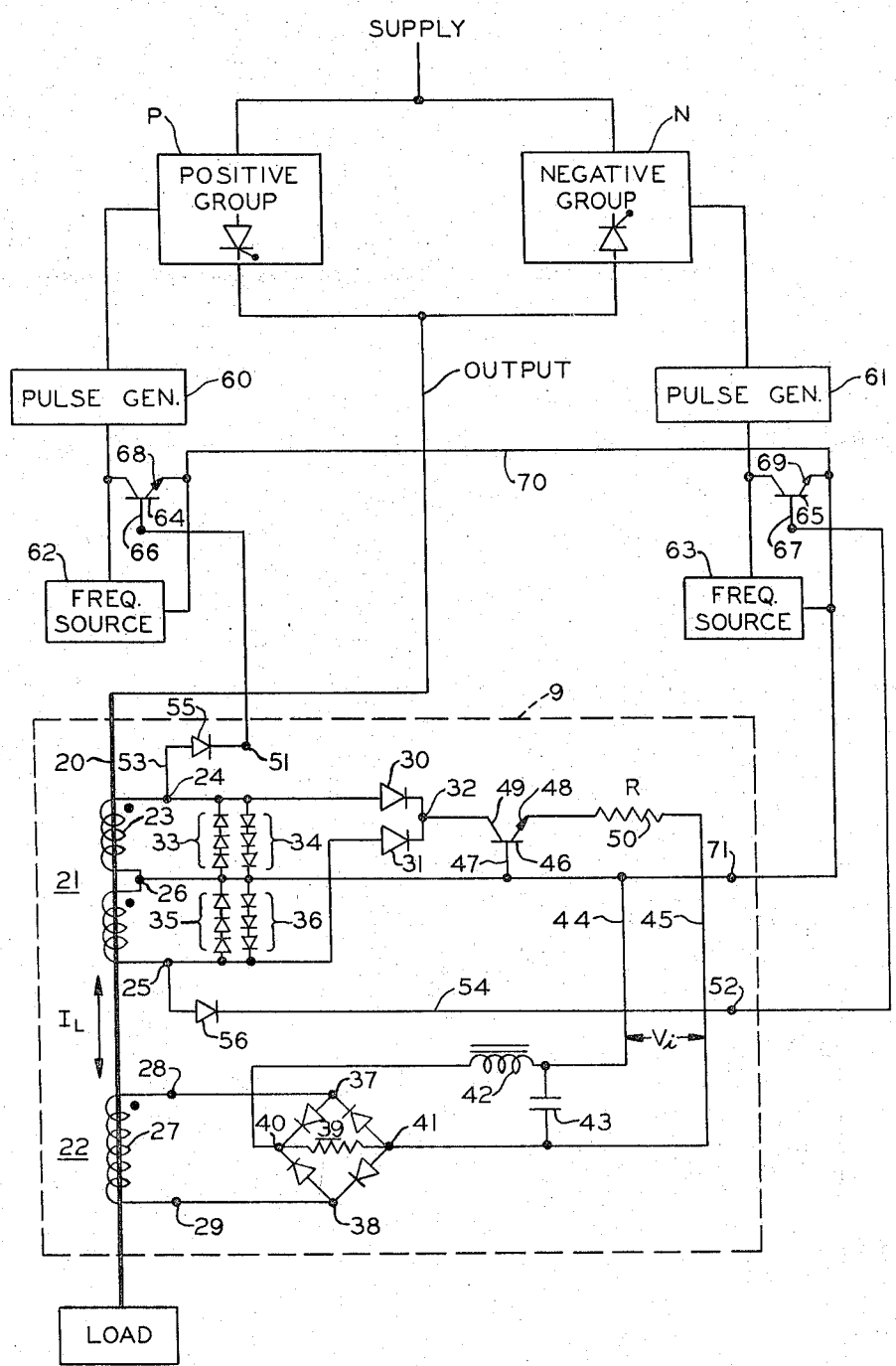
FIGURE 6 is a circuit diagram showing a preferred embodiment of the pulse-forming circuit of my invention and its relationship to a cycloconverter when used in conjunction therewith.

A preferred embodiment of my invention of a pulse-forming circuit as utilized for reducing distortion in the wave shape of the output current of a cycloconverter is shown in FIGURE 6. The total output current $I_L$ of the cycloconverter is carried by output conductor 20 to the load. The pulse-forming circuit senses this total output current by means of two current transformers 21 and 22. Transformer 21 has a secondary winding 23 inductively associated with output conductor 20 and provided with output terminals 24 and 25 at opposite ends of secondary winding 23 and a center tap terminal 26. Transformer 22 has a secondary winding 27 inductively associated with output conductor 20 and terminated at output terminals 28 and 29.

Output terminal 24 of transformer 21 is connected to the anode of rectifier 30 and output terminal 25 of transformer 21 is connected to the anode of rectifier 31. The cathodes of rectifiers 30 and 31 are connected together as at points 32 so that the push-pull output of center-tapped current transformer 21 produced by alternating current in conductor 20 appears between point 32 and the point of reference potential at center tap 26 of the transformer. This output is a pulsating voltage typical of the unfiltered output of full wave rectifiers. The instantaneous value of each puse of the output relative to the reference potential at center tap 26 is proportional to the instantaneous value of a half wave of the total cycloconverter output current appearing in conductor 20.

The output voltage of transformer 21 is preferably limited to an appropriate maximum value by four serially connected sets of diodes 33, 34, 35 and 36. Diode sets 33 and 34 are connected in opposite directions across that portion of secondary winding 23 of transformer 21 between output terminal 24 and center tap 26. Diode sets 35 and 36 are connected in opposite directions across that portion of secondary winding 23 of transformer 21 between output terminal 25 and center tap 26. The output voltage appearing between either of the output terminals 24 or 25 and center tap 26 is thus limited to the value of the forward voltage drop across diode sets 33 and 34 or diode sets 35 and 36. Serially connected sets of any suitable number of diodes may be employed, of course, in place of diode sets 33, 34, 35 and 36 of three diodes each in order to determine the maximum output voltages appearing between the output terminals and center tap of transformer 21.

Secondary output terminals 28 and 29 of transformer 22 are connected to the input terminals 37 and 38, respectively, of a conventional full wave bridge rectifier 39. The output of bridge rectifier 39 appearing at terminals 40 and 41 thereof is filtered by a choke-input filter consisting of an inductive element 42 and capacitive element 43 and appears in filtered form between conductors 44 and 45 as output voltage $V_1$.

The full wave filtered output $V_1$ of current transformer 22 thus constitutes a relatively smooth unidirectional potential proportional to the average value of the half wave current envelope of the cycloconverter output current $I_L$. This output is also proportional to the peak value of a half wave of an alternating current input of generally sinusoidal form.

Transistor 46 having a base 47, an emitter 48 and a collector 49 comprises a comparing and control element for comparing the push-pull output of current transformer 21 and the average value output $V_1$ and for controlling the output pulse of the pulse-forming circuit in accordance with the results of the instantaneous comparisons of the two outputs. The collector-base circuit of transistor 46 is connected across the push-pull output of current transformer 21 and rectifiers 30 and 31 by connection of collector 49 to output terminal 32 and base 47 to center tap 26. The emitter-base circuit of transistor 46 is connected to the rectified and filtered output of current transformer 22 by connection of emitter 48 to output conductor 45 through emitter-resistor 50 having a value R and base 47 to output conductor 44. By this connection of transistor 46, output conductor 44 associated with current transformer 22 is tied to center tap 26 of current transformer 21.

The pulse-forming circuit described above produces two separate unidirectional output signals. To this end, there are provided two output terminals 51 and 52 connected by conductors 53 and 54 to terminals 24 and 25, respectively, of the secondary winding of current transformer 21. A unidirectional impedance 55 is provided in conductor 53 between transformer terminal 24 and output terminal 51 to permit only the flow of current away from terminal 24. A similar unidirectional impedance 56 is provided in output conductor 54.

In operation, the pulse-forming circuit provides a unidirectional output signal at output terminal 51 at all times when the current level of one half wave of the alternating current envelope sensed in conductor 20 exceeds a predetermined fraction of the peak or average value of the half wave. At all other times, the voltage output at terminal 51 is zero. It also provides another unidirectional output signal at output terminal 52 at all times when the other half wave of the alternating current envelope sensed in conductor 20 exceeds the same predetermined fraction of the peak or average value mentioned before.

This result is brought about in particular by the operation of the comparing and control device or transistor 46. In the circuit described above, the current through the transistor may never exceed the level $V_i/R$. Because the value R of emitter-resistor 50 is fixed and because the voltage $V_i$ appearing across output conductors 44 and 45 is proportional to the average or peak value of a half wave of the alternating current envelope sensed in output conductor 20, current $V_i/R$ is, at all times, proportional to the average or peak value of a half wave of the alternating current envelope sensed in conductor 20. As long as the collector current supplied by the push-pull output of current transformer 21 and rectifiers 30 and 31 remains below the current level $V_i/R$, transistor 46 is in saturation, shorting the positive output of current transformer 21 and preventing the build-up of any positive potential differences between its output terminals.

When the level of collector current as compared by transistor 46 reaches the current level $V_i/R$, the collector current can no longer increase. Thereupon, the output voltage of transformer 21 will rapidly rise to a value limited by the diodes connected across winding 23 and appear as a unidirectional output voltage signal at either output terminal 51 or 52, depending upon which half wave of the alternating current envelope comprising the total current in conductor 20 has produced the collector current which equals the current level $V_i/R$. Assuming that the unidirectional output pulse appears at output terminal 51, the signal will continue until the collector current falls below current level $V_i/R$. As the push-pull output of current transformer 21 and rectifiers 30 and 31 continues to supply transistor 46 with a collector current that periodically increases to and then falls below the $V_i/R$ current level in response to alternate half waves of the alternating current envelope sensed in conductor 20, unidirectional output voltage signals will alternately appear at output terminals 51 and 52 during those periods of time when the collector current equals the corresponding emitter current.

It will be obvious to those skilled in the art that by appropriate changes in the circuit connections, a PNP transistor may be used rather than the NPN transistor 46. In like manner, suitable devices other than transistors for performing the functions of transistor 46 may be substituted as well.

The output signals appearing at output terminals 51 and 52 and produced by the pulse-forming circuit 9 of my invention as described above may be used to reduce the aforementioned distortion in the alternating current envelope of the total output current of a cycloconverter by employing them as "blanking" signals for blocking, diverting or otherwise suppressing the switching pulses conventionally provided the positive and negative groups of rectifying and switching devices of the cycloconverter. In this manner, the point of switching between the positive and negative groups can be controlled.

As indicated diagrammatically in FIGURE 6 in connection with the pulse-forming circuit, pulse generators 60 and 61 are operatively associated with the positive and negative current groups P and N, respectively, of the cycloconverter for providing switching pulses to the switching and rectifying devices of the respective current groups. Pulse generators 60 and 61 provide appropriate switching signal pulses to their associated groups of switching and rectifying devices in accordance with control frequency signals provided by sources 62 and 63, respectively, of control frequency signals. The signals provided by sources 62 and 63 may be a single reference frequency signal or the mixture of a supply frequency signal and a reference frequency signal.

For clarity in illustration and description, the control frequency signals are shown as being supplied to the positive and negative group pulsing means or pulse generators 60 and 61 from separate sources 62 and 63, respectively. It is contemplated by this invention that the patterns of control frequency signals supplied to the pulse generators 60 and 61 may be produced by what may be considered as a single circuit arrangement which provides a pattern of frequency signals for each of pulse generators 60 and 61. Whether the patterns of frequency signals be thought of as coming from one composite source or two sources, it will be understood from presently known cycloconverter art that the patterns ultimately controlling the conduction of the positive and negative current conducting groups are 180° out of phase with each other and in accordance with opposite half waves of load current in the output circuit.

Positive and negative current groups P and N, pulse generators 60 and 61 and control frequency signal sources 62 and 63 comprising the cycloconverter are all known elements in the cycloconverter art and, as such, form no particular part of this invention. The details and operation of a particular cycloconverter and its associated pulse generators and control frequency signal sources that is comprehended by this disclosure can be found in United States Patent No. 2,995,696, issued August 8, 1961, on the application of L. J. Stratton et al.

The switching pulses to all of the rectifying and switching devices in the positive group can easily and simply be suppressed and thus conduction by the positive group prevented by "blanking" or cutting off the control frequency signals supplied to pulse generator 60 from source 62. The negative current group can be controlled in the same way. This can be accomplished, for example, by a simple switch such as transistor 64 associated with the positive current group and transistor 65 associated with the negative current group. Transistors 64 and 65 of the NPN type as shown are connected with their collector-emitter circuits across the control signal outputs of their respective signal sources 62 and 63. Terminal 51 of the pulse-forming circuit is connected to the base 66 of transistor 64, for example, and terminal 52 of the pulse-forming circuit is connected to the base 67 of transistor 65 associated with the negative group. The emitters 68 and 69 of transistors 64 and 65, respectively, are tied by means of conductor 70 to common terminal 71 of pulse-forming circuit 9 and thus to center tap 26 of current transformer 21.

It will be apparent that other blanking mechanisms and methods than those described above may be employed and work successfully with the voltage signals of pulse-forming circuits comprehended by my invention.

The phase relationships involved in the pulse-forming circuit are such that when the instantaneous value of the positive half wave of the alternating current envelope sensed in conductor 20 (the output of the cycloconverter) exceeds a predetermined fraction $KI_p$ of its average or peak value, a unidirectional voltage pulse is supplied from output terminal 52 of the pulse-forming circuit to base 67 of transistor 65, turning the transistor "on" and thereby blanking the output of frequency signal source 63 and preventing conduction by the negative group N of the cycloconverter. This unidirectional pulse will continue to hold the transistor 65 "on" and thereby negative current group N non-conducting until the positive half wave sensed in conductor 20 falls below the same predetermined fraction $KI_p$ of its average or peak value. Approximately instantaneously with the termination of the voltage pulse appearing at output terminal 52, negative current group N begins conducting and the instantaneous current level exceeds $KI_p$ whereupon a unidirectional voltage pulse is supplied from terminal 51 of the pulse-forming circuit to base 66 of transistor 64, turning the transistor "on" and thereby blanking the output of frequency signal source 62 and rendering positive group P non-conducting. This unidirectional pulse prevents conduction by positive group P until the instantaneous value of the negative half wave of current sensed in conductor 20 falls below a predetermined fraction of its average or peak value. Again, almost instantaneously, positive current group P begins conducting and a unidirectional voltage pulse is supplied from output terminal 52 as the positive half wave of the alternating current envelope sensed in conductor 20 again exceeds a predetermined fraction $KI_p$ of its average or peak value. As long as there is an alternating current to be sensed in conductor 20, this operation continues in the manner described above.

It will be apparent that the current level $KI_p$ or that predetermined fraction of the average or peak value of the cycloconverter output wave form is determined by the proportionality ratios of current transformers 21 and 22 and the value R of emitter-resistor 50. The level $KI_p$ can be adjusted by varying the value R of resistor 50 and should be selected so as to accomplish switching between the positive and negative groups at the 180° points of the idealized sinusoidal wave form so that distortion is reduced to a minimum.

The pulse-forming circuit of my invention and as comprehended by the embodiment of it described above is very stable and independent of transistor parameter variations as well as temperature changes because one hundred percent feedback is employed in the connection of transistor 46. In addition, when used in conjunction with a cycloconverter, the proportioning feature of the circuit which adjusts the switching point between positive and negative groups of the cycloconverter in accordance with the peak or average value of a half wave of alternating current output reduces output distortion and increases the sinusoidal characteritsic of the output wave form for all load levels. The circuit also has the ability to handle extremely light loads as well as heavy short circuit load currents.

Those skilled in the art will appreciate that various changes and modifications can be made in the apparatus described herein without departing from the spirit and scope of the invention.

I claim:

1. A circuit for producing from a half wave of an alternating input signal a unidirectional output signal when the instantaneous level of the half wave of alternating input signal exceeds a predetermined proportion of its half wave average value comprising
    an input terminal to which the input signal is applied,
    an output terminal from which the output signal is supplied,
    a first sensing of signal-producing circuit means operatively connecting said input terminal and said output terminal for sensing the instantaneous level of the input signal and providing a first signal at said output terminal proportional to said input signal,
    a second sensing and signal-producing circuit means operatively connected to said input terminal for sensing and averaging the instantaneous level of the input signal and providing a second signal proportional to a constant fraction of the average value of a half wave of the input signal, and
    a comparing and control device connected to said first and second circuit means for receiving and comparing the signals provided by them and for providing a short circuit path for diverting from said output terminal that portion of said first signal whose level is less than the level of said second signal and for permitting that portion of said first signal whose level is greater than the level of said second signal to appear at said output terminal.

2. The circuit according to claim 1 in which said comparing and control device comprises a transistor having a base electrode and two main electrodes, one of said main electrodes being connected to said output terminal for receiving said first signal and the other of said output terminals being connected to said second circuit means for receiving said second signal, said base electrode being connected to said first circuit means.

3. A pulse-forming circuit comprising two output terminals,
    a point of constant reference potential and
    a transistor having two main electrodes and having a base electrode connected to said point of reference,
    a unidirectional impedance connected between each output terminal and one of said main electrodes, each of said impedances being arranged to conduct in the same direction with respect to its associated output terminal as the other,
    first means for applying an alternating current input signal to said output terminals, said input signal being applied in push-pull relative to said point of reference potential,
    second means for applying a variable unidirectional signal proportional to a constant fraction of the half wave average value of said alternating current input signal between the other main electrode of the transistor and said point of reference potential,
    whereby output signals proportional to that portion of the positive and negative half waves of the alternating current input signal whose level exceeds said constant fraction of its half wave average value appear alternately at said output terminals.

4. The circuit according to claim 3 in which said second means comprises a full wave rectifier having output terminals and input terminals to which said alternating current input is applied, circuit means connected to said rectifier output terminals for smoothing the unidirectional output of said rectifier, a resistance connected between one of said rectifier output terminals through said smoothing circuit means and the other main transistor electrode, and the other rectifier output terminal connected to said base electrode.

5. The circuit according to claim 3 in which said first means comprises a current transformer having a primary conductor for receiving the alternating current input signal and a center-tapped secondary winding connected between said output terminals and having its center tap connected to said point of reference potential.

6. The circuit according to claim 5 together with clipping diodes connected in oppositely directed parallel branches between each end of said current transformer secondary and its center tap for limiting the maximum voltage of the output signals appearing at said output terminals.

7. A circuit for producing blanking signals for a cycloconverter, said circuit having a blanking signal sensitivity cotnrol responsive to cycloconverter load current feedback comprising
    two output terminals,
    a point of constant reference potential and
    a transistor having two main electrodes and having a base electrode connected to said point of reference,
    a unidirectional impedance connected between each output terminal and one of said main electrodes, each of said impedances being arranged to conduct in the same direction with respect to its associated output terminal as the other,
    first means for applying an alternating current input signal proportional to the envelope of the cycloconverter load current to said output terminals, said input signal being applied in push-pull relative to said point of reference potential, second means for applying a variable unidirectional signal proportional to a constant fraction of the half wave average value of the alternating curernt envelope of the cycloconverter load current between the other main electrode of the transistor and said point of reference potential, whereby blanking signals proportional to that portion of the positive and negative half waves of the alternating current envelope of the cycloconverter load current whose level exceeds said constant fraction of its half wave average value appear alternately at said output terminals.

8. The circuit according to claim 7 in which said second means comprises a full wave rectifier having output terminals and input terminals to which an alternating current input proportional to the alternating current envelope of the cycloconverter load current is applied, circuit means connected to said rectifier output terminals for smoothing the unidirectional output of said rectifier, a resistance connected between one of said rectifier output terminals through said smoothing circuit means and the other main transistor electrode, and the other rectifier output treminal connected to said base electrode.

9. The circuit according to claim 7 in which said first means comprises a current transformer for sensing the cycloconverter load current having a center-tapped secondary winding connected between said output terminals and having its center tap connected to said point of reference potential.

10. The circuit according to claim 9 together with clipping diodes connected in oppositely directed parallel branches between each end of said current transformer secondary and its center tap for limiting the maximum voltage of the blanking signals appearing at said output terminals.

11. In a cycloconverter having positive and negative current groups of rectifying and switching devices connected in parallel back-to-back arrangement with a load supplying output circuit for alternately supplying positive and negative half waves of load current, a source of control frequency signals for providing a first pattern of signals prescribing the firing of the rectifying and switching devices of the positive current group and a second pattern of signals prescribing the firing of the rectifying and switching devices of the negative current group, a first pulsing means associated with said source of control frequency signals and with said positive current group for providing firing pulses thereto in accordance with said first pattern of signals from said source for the control of the rectifying and switching devices of said positive current group, a second pulsing means associated with said source of frequency signals and with said negative current group for providing firing pulses thereto in accordance with said second pattern of signals from said source for control of the rectifying and switching devices of said negative current group, the combination with said source of control frequency signals and said first and second pulsing means comprising first blanking means associated with said source of control frequency signals and said first pulsing means for controlling the passage of said first pattern of signals from said source to said first pulsing means, second blanking means associated with said source of control frequency signals and said second pulsing means for controlling the passage of said second pattern of signals from said source to said second pulsing means, pulse-forming means in a circuit relationship with said output circuit for sensing the load current therein and connected to said first and second blanking means for providing blanking signals thereto corresponding to negative and positive half waves respectively of load current sensed in said output circuit, whereby said first pattern of signals from said source is permitted to reach said first pulsing means and said second pattern of signals is prevented from reaching said second pulsing means during each positive half cycle of load current in said output circuit and said first pattern of signals is prevented from reaching said first pulsing means and said second pattern of signals is permitted to reach said second pulsing means during each negative half cycle of load current.

12. The apparatus according to claim 11 in which said pulse-forming means comprises an output terminal connected to each of said blanking means, a point of constant reference potential and a transistor having two main electrodes and having a base electrode connected to said point of reference, a unidirectional impedance connected between each output terminal and one of said main electrodes, each of said impedances being arranged to conduct in the same direction with respect to its associated output terminal as the other, first means for applying an alternating current input signal proportional to the envelope of the cycloconverter load current to said output terminals, said input signal being applied in push-pull relative to said point of reference potential, second means for applying a variable unidirectional signal proportional to a constant fraction of the half wave average value of the alternating current envelope of the cycloconverter load current between the other main electrode of the transistor and said point of reference potential, whereby blanking signals proportional to that portion of the positive and negative half waves of the alternating current envelope of the cycloconverter load current whose level exceeds said constant fraction of its half wave average value appear alternately at said output terminals.

No references cited.

ARTHUR GAUSS, *Primary Examiner.*

S. D. MILLER, *Assistant Examiner.*